(12) United States Patent
Watanabe

(10) Patent No.: US 7,252,526 B2
(45) Date of Patent: Aug. 7, 2007

(54) WATERPROOF CONSTRUCTION OF ROTARY DIAL

(75) Inventor: Satoshi Watanabe, Tokyo (JP)

(73) Assignee: Clarion Co., Ltd, Tokyo (JP)

( * ) Notice: Subject to any disclaimer, the term of this patent is extended or adjusted under 35 U.S.C. 154(b) by 0 days.

(21) Appl. No.: 11/348,134

(22) Filed: Feb. 6, 2006

(65) Prior Publication Data
US 2006/0179970 A1    Aug. 17, 2006

(30) Foreign Application Priority Data
Feb. 10, 2005    (JP) .............................. 2005-035158

(51) Int. Cl.
*H01R 13/52*    (2006.01)
(52) U.S. Cl. .................................... 439/271
(58) Field of Classification Search ................ 439/271, 439/164
See application file for complete search history.

(56) References Cited

U.S. PATENT DOCUMENTS 6,615,000 B2 * 9/2003 Itabashi ...................... 396/435

FOREIGN PATENT DOCUMENTS

JP    11191508    7/1999

* cited by examiner

*Primary Examiner*—Javaid H. Nasri
(74) *Attorney, Agent, or Firm*—Michael J. Striker

(57) ABSTRACT

Provided is a waterproof construction of a rotary dial, which makes it possible to improve a waterproof property with a simple construction and is suited to a marine acoustic equipment.

The waterproof construction of the rotary dial comprises a dial body, a knob member provided at the back of the dial body and comprising a portion provided centrally thereof to be connected to a rotating shaft of an electric part and a portion provided in a rear region thereof to be mounted to a back side of a hole of an escutcheon, and a seal ring held between the knob member and the dial body and having an outer edge thereof brought into contact with an opened edge of the hole of the escutcheon, a ring-shaped waterproof film is interposed between the seal ring and the dial body to have an outer end thereof extending radially beyond a position, in which the seal ring and the opened edge of the hole of the escutcheon contact with each other, and a free end of the waterproof film is deformed by water pressure to seal a position, in which the seal ring and the opened edge of the hole of the escutcheon contact with each other, to prevent invasion of water.

4 Claims, 5 Drawing Sheets

WATERPROOF CONSTRUCTION OF ROTARY DIAL

BACKGROUND OF THE INVENTION

1. Field of the Invention

The present invention relates primarily to a waterproof construction of a rotary dial in acoustic equipment.

2. Description of the Related Art

In acoustic equipment mounting thereon, for example, a radio, a cassette tape recorder, a CD player, a DVD player, etc., sound volume is adjusted, or frequency is adjusted by turning a rotary dial protruded from a panel.

In such acoustic equipment, in particular, acoustic equipment for outdoor and ship loading, it is in dispensable to prevent water from entering into the equipment from around a rotary dial. As a countermeasure for this, JP-A-11-191508 adopts a construction, in which a ring-shaped rubber packing is interposed between a rotary dial and a casing, but it is difficult in a conventional waterproof construction to exactly cope with the case where water pressure is applied.

Besides, in a case of performing ring-shaped illumination around a dial in order to achieve an improvement in operability and outward appearance, a clearance considerably exceeding a clearance required for turning is formed between an outer periphery of the dial and an inside diameter of a hole of a panel or an escutcheon, so that it becomes further difficult to ensure a waterproof property and it cannot be desired to realize a performance of illumination.

SUMMARY OF THE INVENTION

The invention has been thought of in view of solving the above-mentioned problem and has its first object to provide a waterproof construction of a rotary dial, which makes it possible to improve a waterproof property with a simple construction and is suited to a marine acoustic equipment.

In order to attain the first object, the invention provides a waterproof construction of a rotary dial comprising a dial body, a knob member provided at the back of the dial body and comprising a portion provided centrally thereof to be connected to a rotating shaft of an electric part and a portion provided in a rear region thereof to be mounted to a backside of a hole of an escutcheon, and a seal ring held between the knob member and the dial body and having an outer edge thereof brought into contact with an opened edge of the hole of the escutcheon, and wherein a ring-shaped waterproof film is interposed between the seal ring and the dial body and having an outer end thereof extending radially beyond a position, in which the seal ring and the opened edge of the hole of the escutcheon contact with each other.

In the case where a seal ring only contacts with a hole edge of an escutcheon as in the related art, there is a risk that when water enters through a hole of a panel and its water pressure acts on the seal ring, the seal ring is turned up to cause failure in sealing and the entering water penetrates into the escutcheon to reach a substrate. In contrast, according to the invention, since the ring-shaped waterproof film is positioned on the front surface of the seal ring and the outer end (free end) of the waterproof film extends beyond a position, in which the seal ring and the escutcheon contact with each other, a region around the free end of the waterproof film is pushed and deformed to be brought into close contact with an end surface of the opened edge of the hole of the escutcheon when water pressure applies. Therefore, invasion of water from between the outer edge of the seal ring and the opened edge of the hole of the escutcheon is completely shut out, so that an appropriate waterproof capability is ensured.

Also, it is a second object of the invention to provide a waterproof construction of a rotary dial, which enables an appropriate ring-shaped illumination in addition to the ability to improve a waterproof property with a simple construction and is suited to a marine acoustic equipment.

In order to attain the second object, the invention has a feature in that the knob member, the seal ring, and the waterproof film, respectively, are formed from a light transmission material.

According to this, since the knob member, the seal ring, and the waterproof film, respectively, are formed from a light transmission material, a light conducting member is arranged on a side of the substrate to face the knob member whereby light can be transmitted through the knob, the seal ring, and the film to perform illumination around the dial body, and since the waterproof property is good as described above, the hole of the escutcheon surrounding the dial body can be increased whereby an illumination area is increased so as to surely carry out the waterproof function and the illumination function.

Preferably, the waterproof film is flexible but firm not to droop arbitrarily when no external pressure applies, and has a free end thereof deformed to seal a position, in which the seal ring and the opened edge of the hole of the escutcheon contact with each other, when water pressure is applied.

According to this, since the free end of the waterproof film does not contact with the tip end surface of the hole of the escutcheon in a state free of flooding, it is possible to smoothly rotate the dial without resistance and to reduce wear of the free end of the waterproof film.

In a preferred embodiment of the invention, the seal ring comprises a convex base, onto which an inside diameter of the waterproof film is fitted, the dial body comprises an annular-shaped end surface, which interposes the waterproof film between it and the seal ring in a thickness-wise direction of the waterproof film, and the dial body, the waterproof film, the seal ring, and the knob member are caused to overlap and assembled by means of machine elements for fixation.

According to this, since the seal ring, the waterproof film, and the knob member are made closely integral together, a rotary dial having a high waterproof property can be assembled, assembling to the escutcheon is simple, and besides positional deviation of the waterproof film is not caused.

While other features and advantages of the invention will be made apparent from the following descriptions and drawings, the invention is not limited to the construction shown in the embodiment as long as fundamental features of the invention are ensured and it is apparent to those skilled in the art that various changes and modifications are made possible without departing from the scope of the invention.

DESCRIPTION OF THE PREFERRED EMBODIMENT

An embodiment of the invention will be described below with reference to the accompanying drawings.

Figure 1:
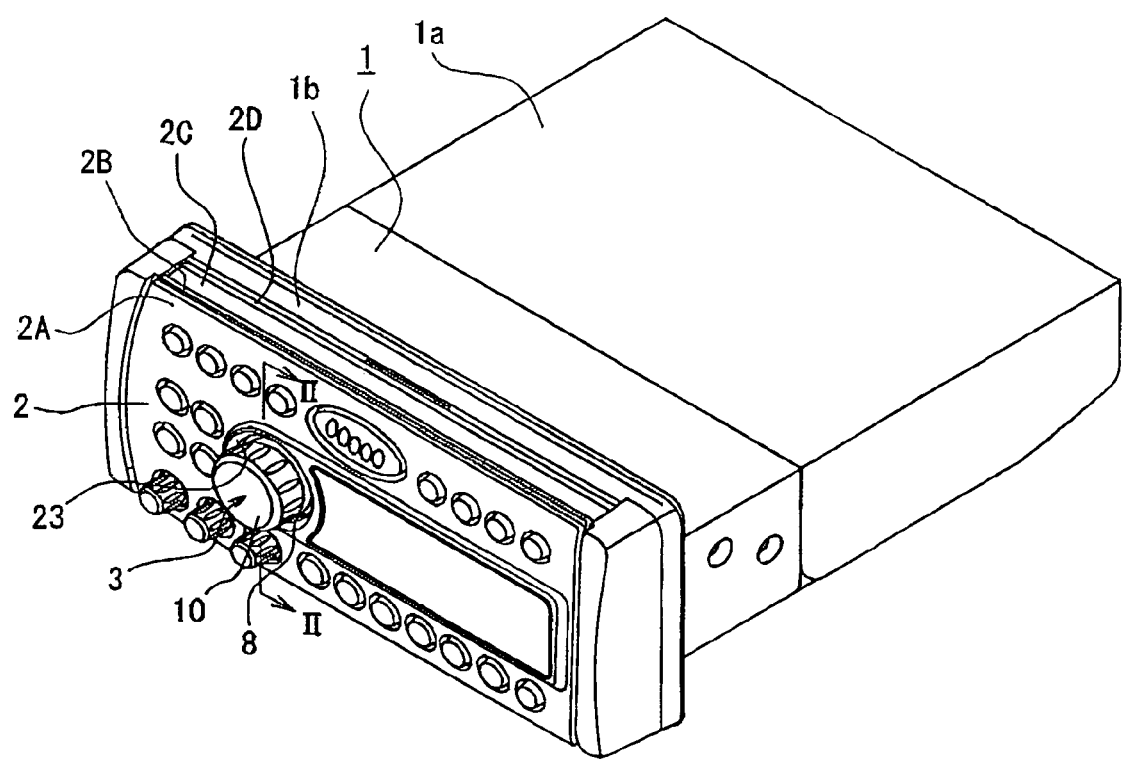
FIG. 1 shows an example of the marine acoustic equipment, to which a waterproof construction of the invention is applied, and in the figure, the reference numeral 1 denotes a body, in which a CD or DVD player body, an electronic circuit, an electric circuit, etc. are assembled.

FIG. 1 shows an example of the marine acoustic equipment, to which a waterproof construction of the invention is applied, and in the figure, the reference numeral 1 denotes a body, in which a CD or DVD player body, an electronic circuit, an electric circuit, etc. are assembled, a periphery of which is covered by a box-shaped cover 1a, and to a front of which is watertightly fixed a body side panel 1b.

The reference numeral 2 denotes a panel, which is of an open and close type in this example to be pivotally mounted to the body by means of several hinges to be able to open and close. The panel 2 comprises a panel body 2A, an escutcheon 2B, and a unit that arranges a substrate 2C and a back face plate 2D, which mount thereon various circuit parts and electric parts, in this order from the front to the rear to fix the same thereto. A liquid crystal display is provided on the panel body 2A, a multiplicity of push buttons for operation of various devices including electric sources for radio, CD, Aux, CeNet, etc. are arranged to extend through the panel body 2A, and a rotary dial 3 affording ring illumination protrudes from the panel body.

FIGS. 2 to 5 show in detail the rotary dial 3 and details of its waterproof construction.

Figure 2:
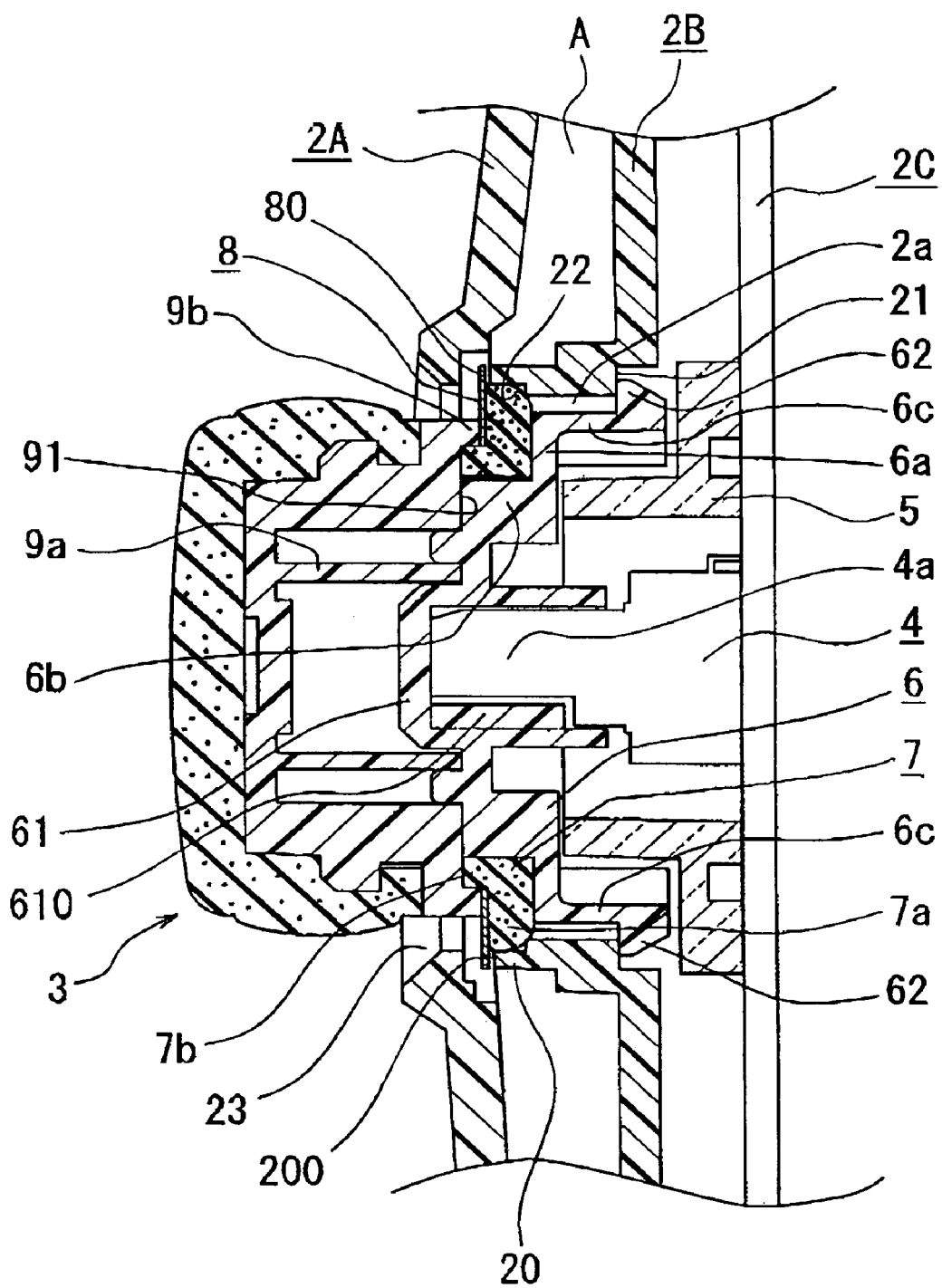
FIG. 2 is a cross sectional view taken along the line II-II in FIG. 1.

First, a rotating shaft 4a of an electric part 4 such as amplifier is protrusively provided on the substrate 2C to positionally correspond to the rotary dial 3 as shown in FIG. 2, a light conducting member 5 surrounding the rotating shaft 4a in a concentric manner is fixed to the substrate, and light conducted from a light source such as LED, etc. is caused by the light conducting member 5 to perform irradiation in a ring configuration toward the panel.

The escutcheon 2B faces the substrate 2C with a predetermined distance therebetween to be provided in a position corresponding to the light conducting member 5 with a hole 2a, which is concentric with the light conducting member 5, and formed on the front side of the hole with a ring-shaped protruding wall 20. Provided annularly in the inner part of the hole 2a is a latch step 21 for connection to a knob member described later to allow rotation thereof but not coming-off thereof. Also, provided inside an opened edge of the protruding wall 20 is a sealing step 22 being brought into close contact with an outer edge of a seal ring described later.

The panel body 2A faces the escutcheon 2B with a predetermined spacing therebetween to provide for a drain space A, and is provided in a position corresponding to the light conducting member 5 with a hole 23, which is sized to allow free turning of the rotary dial 3 and to allow a ring-shaped illumination light surrounding the rotary dial 3 to be visually recognized well.

Figure 3:
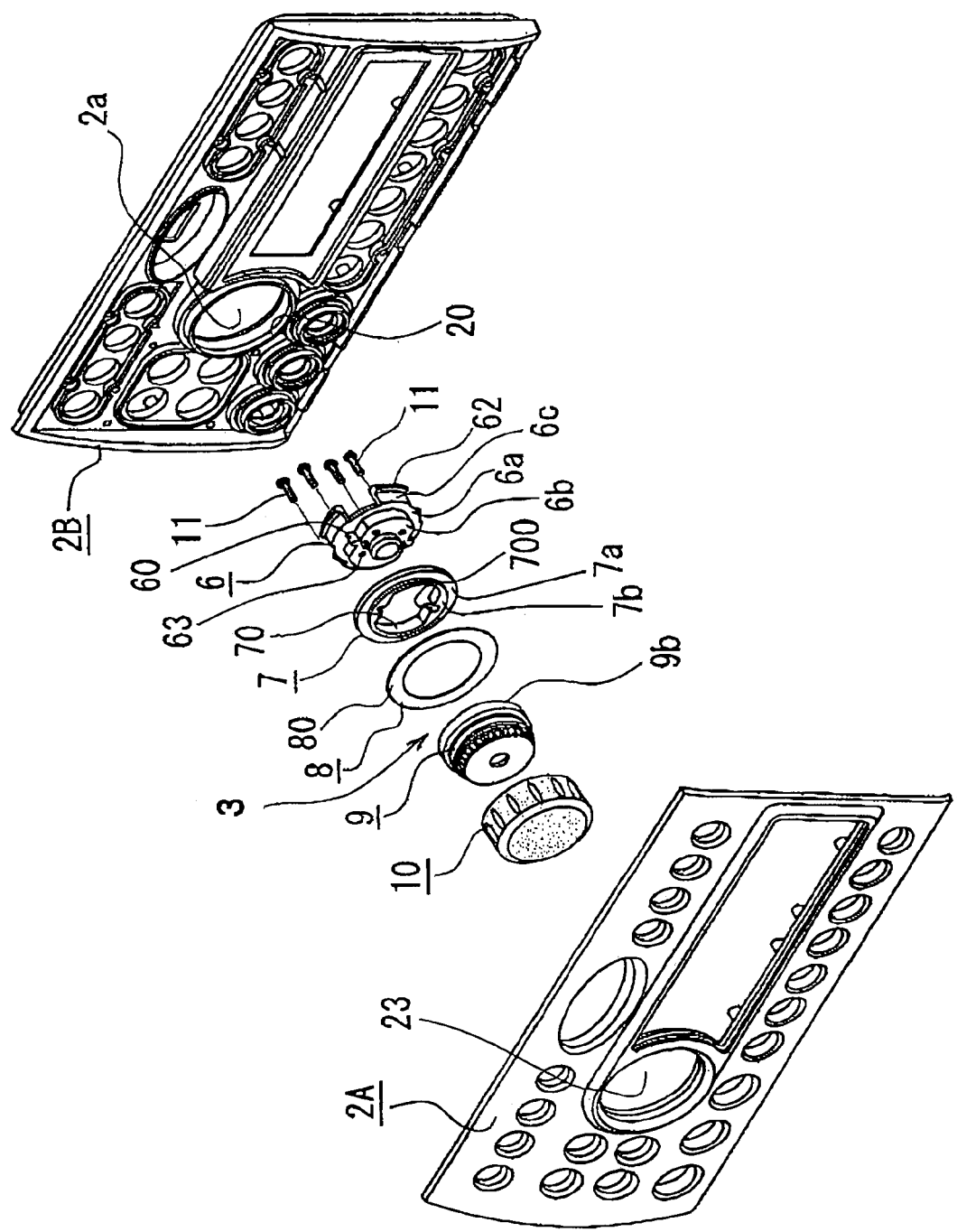
FIG. 3 is a view showing the waterproof construction of the rotary dial in an exploded state.
Figure 4:
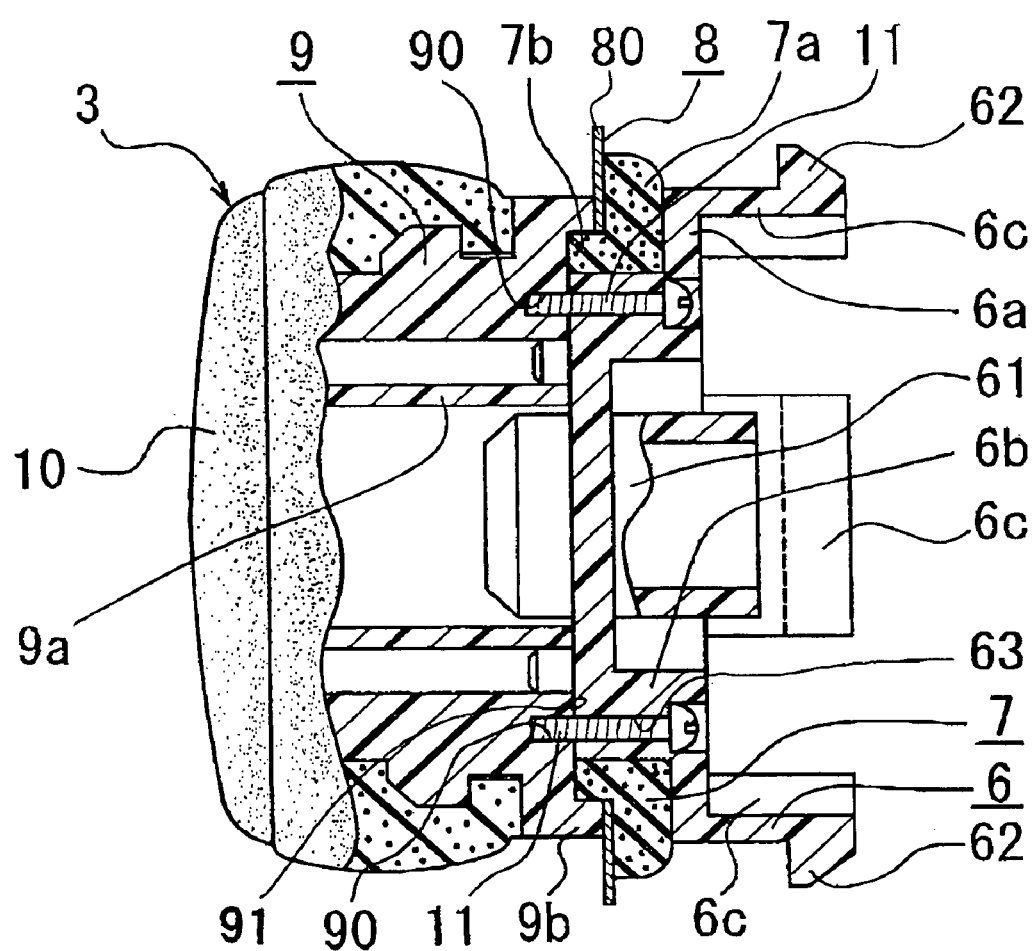
FIG. 4 is a cross sectional view showing the rotary dial in an assembled state.

The rotary dial 3 comprises, as shown in FIGS. 3 and 4, a knob member 6, a seal ring 7, a ring-shaped waterproof film 8, a dial body 9, and a cover 10, and forms an assembly or a unit by assembling these elements by means of screws 11 as machine elements for fixation. In this embodiment, ring-shaped illumination surrounding the dial body 9 is performed.

Stated in detail, the knob member 6 is wholly formed from a molding of a light transmission synthetic resin such as polycarbonate, and a convex base 6b having a shape corresponding to an inner shape of the seal ring 7 is formed on a ring-shaped disk 6a having an outside diameter to allow its loose fitting into the Bole 2a of the escutcheon 2B.

In this example, the convex base 6b has an external shape with two opposite surfaces in parallel to each other as shown in FIG. 2 and positioning projections 60 are provided in several locations on the parallel surfaces. Also, a cylinder 61 extending forward and rearward is formed centrally of a front surface of the convex base 6b as shown in FIGS. 2 and 4. The cylinder 61 comprises ridges 610, which permit fitting of the rotating shaft 4a of the electric part 4 without relative rotation.

A plurality of rearwardly extending legs 6c capable of expansion and contraction are provided contiguously to the disk 6a, and hooks 62, respectively, are formed on the legs 6c to be engageable with the latch step 21 provided on a back surface of the hole of the escutcheon 2B. Provided on the disk 6a and the convex base 6b to extend therethrough are a plurality of through-holes 63, through which the screws 11 extend.

The seal ring 7 is formed from rubber or a synthetic resin, which possesses a non-water-absorbing property but possesses a favorable elasticity and a light transmission property. As an example of the material, for example, milky white or translucent silicone-rubber, or the like is listed.

The seal ring 7 comprises a main portion 7a having a larger diameter than that of the disk 6a of the knob member 6 so as to include an outer peripheral edge, which will contact with the sealing step 22 of the escutcheon 2B. Formed on a front surface of the main portion 7a is a convex base 7b having a circular profile and sized to correspond to an inside diameter of the waterproof film 8. Provided to extend from the convex base 7b to the main portion 7a is a hole 70 shaped and sized to correspond to the convex base 6b of the knob member 6, and provided on the hole 70 is a notch 700, into which the projections 60 of the knob member 6 are fitted.

The waterproof film 8 is formed from a material, such as polyester, having a non-water-absorbing property and a light transmission property, and has a thickness in the order of 0.6 to 1.2 mm so as to be flexible but firm enough not to droop arbitrarily when no external pressure applies.

The waterproof film 8 has an inside diameter consistent with the convex base 7b of the seal ring 7. On the other hand, the waterproof film comprises on an outside diameter side thereof a sealing free end (outward extension) 80 overhanging an outer edge of the main portion 7a of the seal ring 7 to reach an outside of the sealing step 22 of the escutcheon 2B, that is, an outside diameter region of the protruding wall 20 (or may be extended further).

The free end 80 has an appropriate clearance between it and a tip end surface 200 of the protruding wall 20 of the escutcheon 2B. It suffices to set the clearance according to a thickness of the main portion 7a of the seal ring 7, or a height of the sealing step 22.

The dial body 9 is formed from a synthetic resin to be smaller in outside diameter than the seal ring 7. The cover 10 is formed from a rubber material and mounted on the dial body 9 to cover a front surface portion and a side surface portion of the same.

A cylinder 9a being fitted onto the cylinder 61 of the knob member 6 is provided centrally of an inner surface of the dial body 9 to protrude rearward as shown in FIG. 2, and internally threaded holes 90 corresponding to respective through-holes 63 of the knob member 6 are provided on an outside diameter side of the cylinder as shown in FIG. 4.

Also, the dial body 9 comprises a rear end surface 91 capable of close contact with a front surface of the convex base of the knob member 6, and an annular wall 9b, of which an inside diameter is consistent with the convex base 7b of the seal ring 7, is provided on an outer edge of the rear end surface 91, an end surface of the annular wall pushing against a half region on an inside diameter side of the waterproof film 8.

Subsequently, an operation of the embodiment will be described.

First, it is described on a method of assembling the rotary dial according to the invention. The rotary dial 3 is completed as an assembly shown in FIG. 4 from an exploded state shown in FIG. 3 by fitting the hole 70 of the seal ring 7 onto the convex base 6b of the knob member 6 while covering the dial body 9 with the cover 10, fitting an inside diameter of the waterproof film 8 onto the convex base 7b of the seal ring 7, and inserting the screws 11 into the through-holes 63 of the knob member 6 to clamp the same. Accordingly, it is possible to simply perform assembly in a short time.

In the assembled state, since an inside diameter region of the waterproof film 8 is interposed between the rear end surface of the annular wall 9b and the main portion 7a of the seal ring 7, the waterproof film 8 does not shift in a radial direction and in a longitudinal direction, so that a whole periphery thereof is put in a state of protruding uniformly in the radial direction. Also, the seal ring 7 has a rear surface thereof brought into close contact with the disk surface of the knob member 6, has an inside diameter surface thereof, which is of a modified shape, brought into close contact with the convex base 6b of the knob member 6, which is of a modified shape, has a front end surface of the convex base 7b brought into close contact with the rear end surface 91 of the dial body 9, and has an outer peripheral surface of the convex base brought into close contact with an inner surface of the annular wall of the dial body 9. Accordingly, the seal ring 7 is made closely integral with the knob member 6 and the dial body 9. Also, since the cylinder 61 of the knob member 6 is fitted internally into the cylinder 9a of the dial body 9, positional deviation thereof is not caused.

In order to assemble the dial assembly 3 into the panel, the central cylinder 61 of the knob member 6 is fitted onto the rotating shaft 4a protruding outside the escutcheon 2B while the legs 6c are caused to contract and inserted into the hole 2a of the escutcheon 2B until the seal ring 7 abuts on the sealing step 22. At this time, since the free end 80 of the waterproof film 8 serves as a stopper, it is possible to readily perceive whether such insertion is good or bad. Since the hooks 62 are latched on the latch step 21 when the legs 6c are expanded in diameter, assembly is completed in one touch. It sufficed to then set and assemble the hole 23 of the panel body 2A to the dial body 9, and thus an assembled state shown in FIG. 2 is brought about.

In use, by holding and turning the cover 10 and the dial body 9, the whole including the knob member 6 is turned while the seal ring 7 slidingly contacts with the sealing step 22 of the escutcheon 2B and the rotating shaft 4a connected to the knob member 6 is rotated, so that sound level or the like is adjusted, or frequency is adjusted.

At this time, since the free end 80 of the waterproof film 8 droops little, an unnecessary feeling of resistance due to contact with an end surface of the protruding wall 20 is not generated, and the waterproof film 8 is little worn due to the repeated friction on the end surface of the protruding wall 20, which accompanies rotation.

Figure 5:
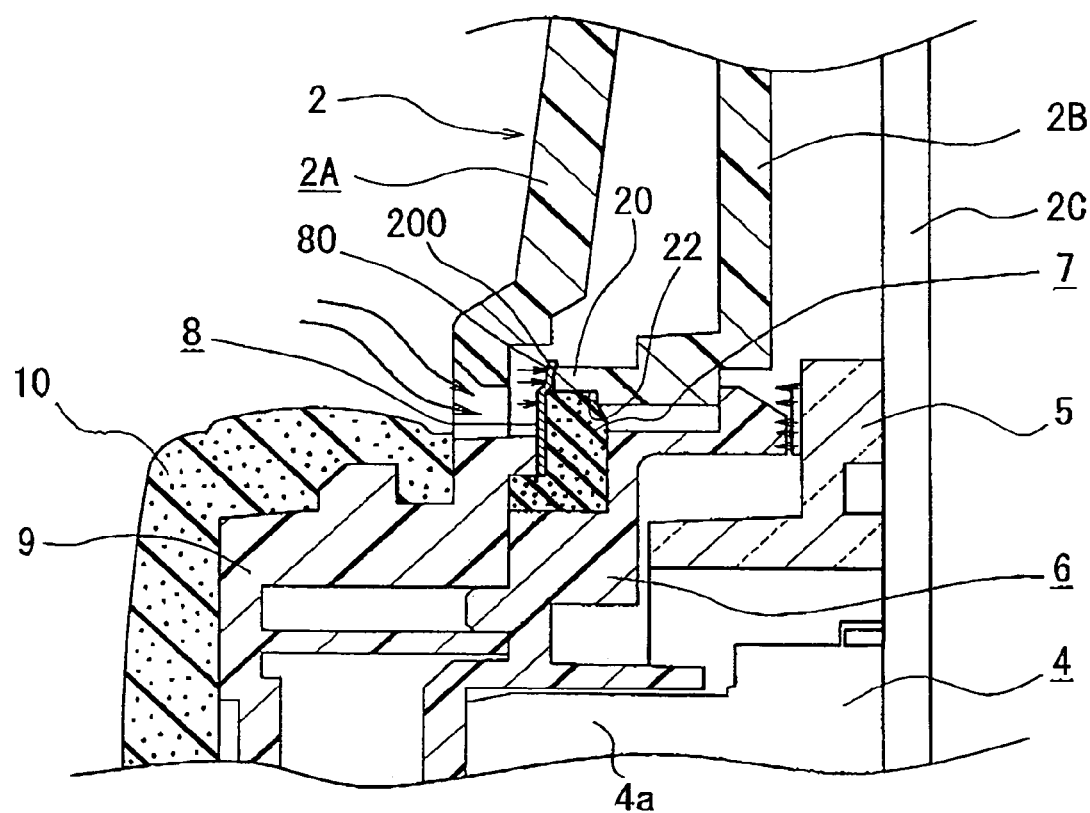
FIG. 5 is a partial, cross sectional view showing a change of state when water pressure is loaded.

In such a state of use, when water enters through the hole 23 of the panel body 2A as indicated by arrows in FIG. 5, the free end 80 of the waterproof film 8 put in a state of floating somewhat from the protruding wall 20 is deformed as shown in FIG. 5 due to application of water pressure from the front and comes into close contact with the tip end surface 200 of the protruding wall 20 of the escutcheon 2B. Since such degree of close contact is enhanced as water pressure increases, that phenomenon, in which water enters inside through the clearance between the seal ring 7 and the escutcheon 2B, is completely prevented.

When light is conducted to the light conducting member 5 from a light source (not shown) in the case where the knob member 6, the seal ring 7, and the waterproof film 8 are formed from a light transmission material as in the embodiment, beam of light is irradiated through the ring-shaped disk 6a of the knob member 6, the annular-shaped main portion 7a of the seal ring 7 in contact therewith, and the waterproof film 8 in contact therewith, so that illumination surrounding the dial body 9 is performed in the hole portion of the panel body 2A. Since luminance illumination can be performed by the use of a blue diode as a light source, it is possible to achieve an improvement in operability and outward appearance while ensuring an appropriate waterproof property.

In addition, the invention is not limited to the embodiment.

1) The waterproof film 8 may be beforehand stuck to the seal ring 7.

2) In the case where any ring-shaped illumination is unnecessary, it is not necessary to form the knob member 6, the seal ring 7, and the waterproof film 8 from a light transmission material.

3) It is not necessarily required that the panel be of an open and close type.

What is claimed is:

1. A waterproof construction of a rotary dial comprising a dial body, a knob member provided at the back of the dial body and comprising a portion provided centrally thereof to be connected to a rotating shaft of an electric part and a portion provided in a rear region thereof to be mounted to a back side of a hole of an escutcheon, and a seal ring held between the knob member and the dial body and having an outer edge thereof brought into contact with an opened edge of the hole of the escutcheon, and wherein a ring-shaped waterproof film is interposed between the seal ring and the dial body and having an outer end thereof extending radially beyond a position, in which the seal ring and the opened edge of the hole of the escutcheon contact with each other.

2. The waterproof construction of the rotary dial according to claim 1, wherein the waterproof film is flexible but firm enough not to droop arbitrarily when no external pressure applies, and has a free end thereof deformed to seal a position, in which the seal ring and the opened edge of the hole of the escutcheon contact with each other, when water pressure is applied.

3. The waterproof construction of the rotary dial according to claim 1, wherein the seal ring comprises a convex base, onto which an inside diameter of the waterproof film is fitted, the dial body comprises an annular-shaped end surface, which interposes the waterproof film between it and the seal ring in a thickness-wise direction of the waterproof film, and the dial body, the waterproof film, the seal ring, and the knob members are caused to overlap and assembled by means of machine elements for fixation.

4. The waterproof construction of the rotary dial according to claim 1, wherein the knob member, the seal ring, and the waterproof film poses a light transmission property.

* * * * *